(12) United States Patent
Breakfield

(10) Patent No.: US 7,694,774 B2
(45) Date of Patent: Apr. 13, 2010

(54) REDUCED WIND RESISTANT HAULAGE VEHICLE APPARATUS

(76) Inventor: Kenneth R. Breakfield, 2171 Highway 98 East, Columbia, MS (US) 39429

(*) Notice: Subject to any disclaimer, the term of this patent is extended or adjusted under 35 U.S.C. 154(b) by 335 days.

(21) Appl. No.: 11/657,210

(22) Filed: Jan. 25, 2007

(65) Prior Publication Data
US 2008/0179916 A1 Jul. 31, 2008

(51) Int. Cl.
B60J 5/10 (2006.01)
(52) U.S. Cl. ............... 180/311; 180/22; 296/181.5; 296/181.7; 296/182.1
(58) Field of Classification Search ......... 180/311, 180/312, 291, 22, 24.02, 208, 209; 280/86.5; 296/7, 3, 180.1, 180.2, 26.06, 181.5, 181.7, 296/182.1, 183.1, 186.3, 186.4
See application file for complete search history.

(56) References Cited

U.S. PATENT DOCUMENTS

| | | | | |
|---|---|---|---|---|
| 926,971 A | | 7/1909 | Ahrens | |
| 2,583,643 A | * | 1/1952 | Grilley | 296/186.4 |
| 2,855,064 A | * | 10/1958 | McCullough | 180/291 |
| 2,974,999 A | * | 3/1961 | Stuart | 410/28.1 |
| 3,157,426 A | * | 11/1964 | Groat | 296/3 |
| 3,447,831 A | * | 6/1969 | Wagner | 296/175 |
| 3,556,581 A | * | 1/1971 | Silva | 296/173 |
| 4,206,943 A | * | 6/1980 | Friedenberg | 296/26.05 |
| 4,373,738 A | * | 2/1983 | Lange | 180/24.01 |
| 4,379,585 A | * | 4/1983 | Strick | 296/146.8 |
| 4,593,786 A | * | 6/1986 | Tate | 180/291 |
| 4,683,976 A | * | 8/1987 | Hawelka et al. | 180/311 |
| 4,807,924 A | * | 2/1989 | Kottke | 296/164 |
| 4,946,214 A | * | 8/1990 | Neumann et al. | 296/10 |
| 5,056,847 A | * | 10/1991 | Stillwell et al. | 296/50 |
| 5,280,990 A | * | 1/1994 | Rinard | 296/180.1 |
| 5,332,052 A | * | 7/1994 | Carnevale | 180/14.2 |
| 5,445,236 A | * | 8/1995 | Kuhn | 180/14.1 |
| 5,577,793 A | * | 11/1996 | Kobasic | 296/146.4 |
| 5,782,521 A | | 7/1998 | Anderson | |
| 6,033,002 A | * | 3/2000 | Clare et al. | 296/3 |
| 6,106,050 A | * | 8/2000 | McLeod | 296/100.06 |
| 6,139,091 A | * | 10/2000 | Shultz | 296/182.1 |
| 6,152,511 A | * | 11/2000 | Gustafson | 296/32 |
| 6,286,894 B1 | * | 9/2001 | Kingham | 296/181.5 |
| 6,685,256 B1 | | 2/2004 | Shermer | |
| 6,799,793 B1 | * | 10/2004 | Sladen | 296/186.4 |
| 6,883,813 B2 | * | 4/2005 | Gottschalk | 280/86.5 |

* cited by examiner

Primary Examiner—Paul N. Dickson
Assistant Examiner—George D. Spisich

(57) ABSTRACT

A reduced wind resistance haulage vehicle apparatus includes an undercarriage portion which supports a motor/transmission. Driven wheel assemblies are connected to the undercarriage portion and are powered by the motor/transmission. A cab portion is supported by the an undercarriage portion for controlling the motor/transmission. Steering wheel assemblies are supported by the undercarriage portion for steering by a driver seated in the cab portion. A haulage portion is supported by the undercarriage portion. More specifically, the haulage portion includes haulage compartment side walls. Haulage compartment front doors and rear doors are connected to the haulage compartment side walls. When the haulage portion is empty, the front doors and the rear doors are opened, and air flow can flow through the haulage portion when the vehicle is driven along a road surface. As a result, the air resistance of the vehicle is significantly reduced, and the vehicle saves in energy demand and in fuel consumption.

9 Claims, 4 Drawing Sheets

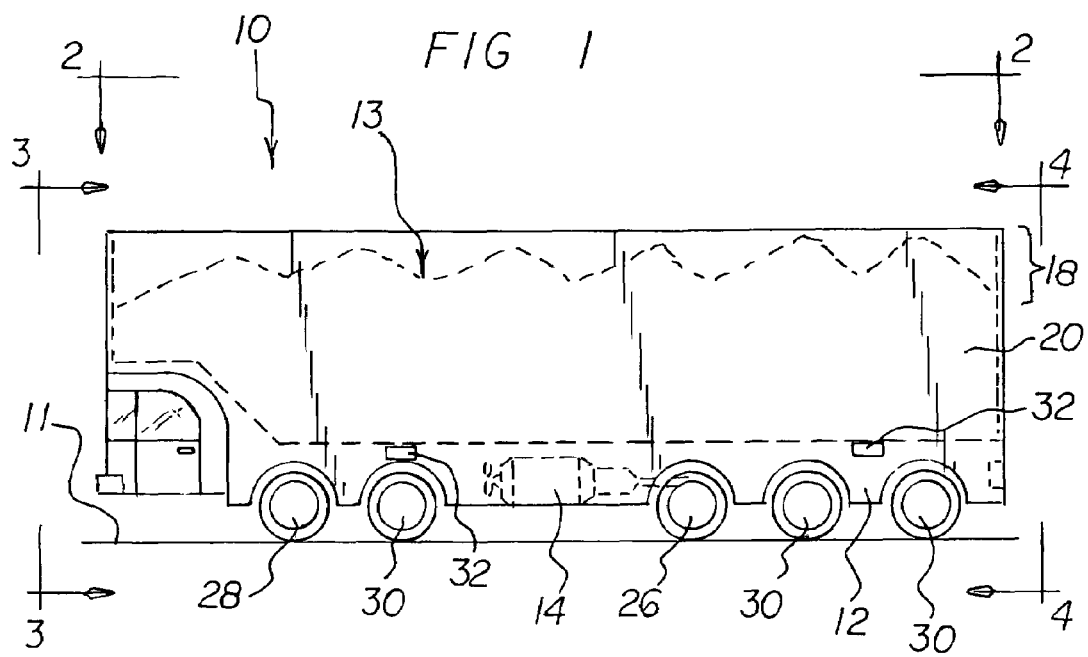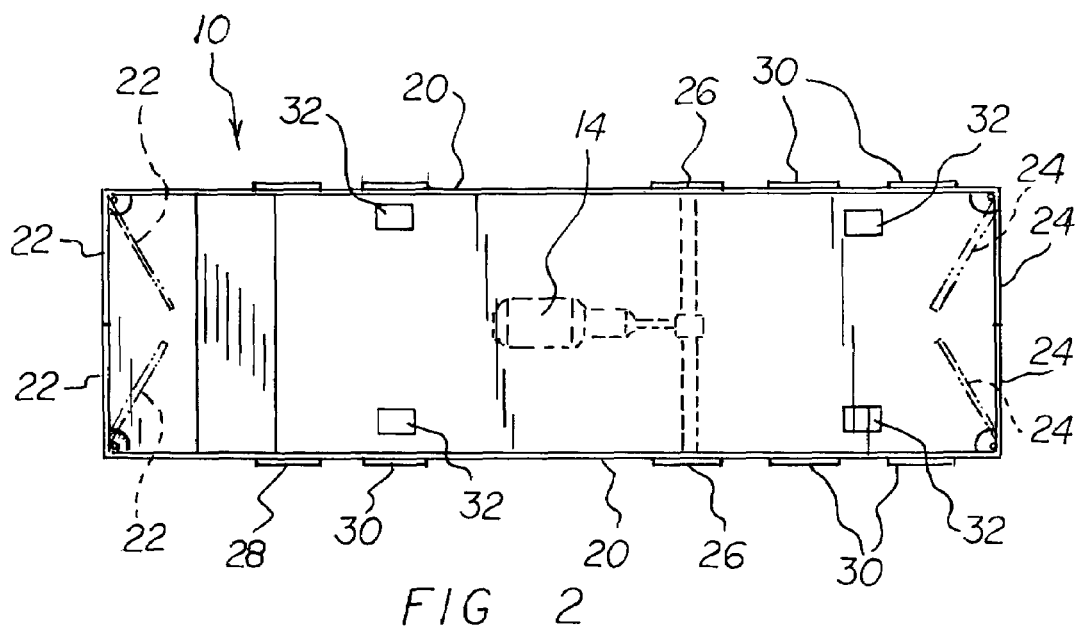

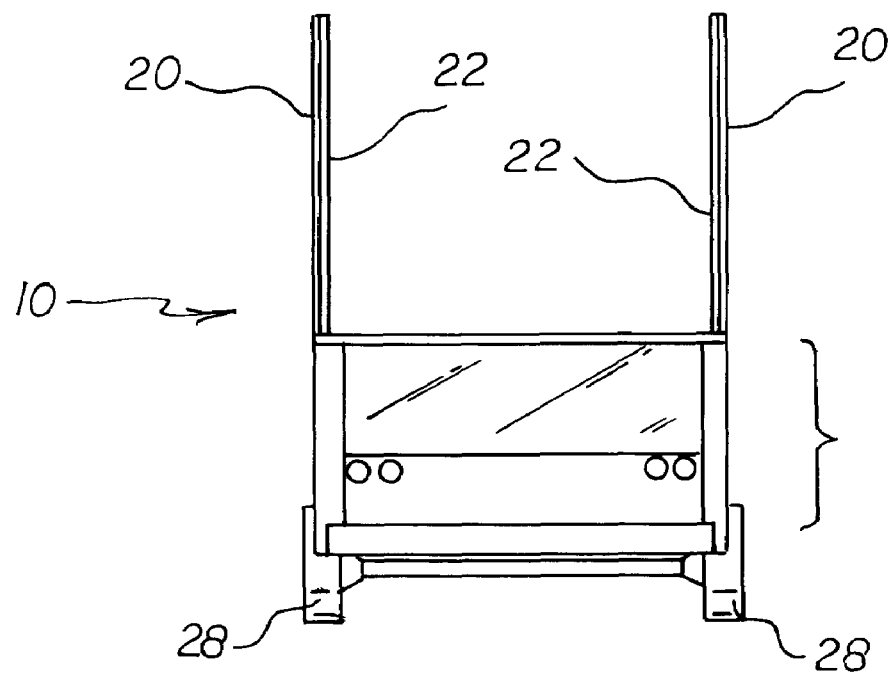

REDUCED WIND RESISTANT HAULAGE VEHICLE APPARATUS

BACKGROUND OF THE INVENTION

1. Field of the Invention

The present invention relates generally to haulage vehicles, and, more particularly, to haulage vehicles especially adapted for reducing air resistance when an empty vehicle is driven.

2. Description of the Prior Art

It is well known in the art that when a vehicle is driven, air resistance is an important factor in causing excess fuel to be consumed, even if the haulage vehicle is empty. To reduce this effect, throughout the years, a number of innovations have been developed relating to the reduction of air resistance in haulage vehicles, and the following U.S. patents are representative of some of those innovations: U.S. Pat. Nos. 926, 971, 5,782,521, and 6,685,256.

More specifically, U.S. Pat. No. 926,971 discloses a railroad car that include front air intake tubes, a front to rear air conveyor duct, and rear air output tubes. Passage of air through the front air intake tubes, the front to rear air conveyor duct, and the rear air output tubes reduces air resistance when compared to a solid front that has no air intake tubes. The volume of the front air intake tubes, the front to rear air conveyor duct, and the rear air output tubes is relatively low compared to the volume of the haulage compartment inside the railroad car. Greater reduction in air resistance could be achieved if the volume of the haulage compartment could be used for air flow, provided that the haulage compartment is empty. In this respect, it would be desirable is a haulage vehicle were provided that permitted air flow through the haulage compartment when the haulage compartment is empty.

U.S. Pat. No. 5,782,521 discloses a tractor trailer that has a retractable overhead front door and a retractable overhead rear door. When the both the front and rear doors are open, air can flow through the haulage compartment of the tractor trailer to reduce air resistance. A tractor trailer, however, must be pulled by a motorized tractor, and the presence of the motorized tractor can block the opening to the front door. In this respect, it would be desirable if a haulage vehicle were provided that includes all of a driver's cab, a motor, and a haulage compartment that are integrated into a single vehicle so that front doors of a haulage compartment are not blocked by a motorized tractor.

U.S. Pat. No. 6,685,256 discloses a trailer drag reduction system which includes an air intake opening, an air conveyor, and an outlet opening, all outside the interior of a trailer. Just as with U.S. Pat. No. 926,971, this trailer drag reduction system does not permit air to flow through the haulage compartment when the haulage compartment is empty.

Still other features would be desirable in a reduced wind resistance haulage vehicle apparatus. For example, in a conventional motorized tractor, the motor is located relatively close to the cab in which the driver sits. As a result, the driver experiences noise and vibration from the motor. In contrast, with an integrated haulage vehicle, in which the cab, the motor, and the haulage compartment are integrated, the motor can be located under the haulage compartment, at a considerable distance from the cab in which the driver sits, thereby reducing motor noise and vibration experienced by the driver.

In addition, it is well known that for a heavy load, more wheels and tires are needed to carry a heavy load in a haulage compartment than when the haulage compartment is empty. Nevertheless, a haulage vehicle comes with a fixed number of wheels and tires. Wheels and tires that roll along a road surface generate a substantial amount of kinetic resistance and require fuel consumption whether or not the haulage compartment is full or empty. However, to reduce fuel consumption for an empty haulage compartment, it would be desirable if some wheels and tires could be elevated above the road surface, so that they do not roll along the road surface when the haulage compartment is empty.

Thus, while the foregoing body of prior art indicates it to be well known to use channels in haulage vehicles for air flow to reduce air resistance, the prior art described above does not teach or suggest a reduced wind resistance haulage vehicle apparatus which has the following combination of desirable features: (1) permits air flow through the haulage compartment when the haulage compartment is empty; (2) provides a haulage vehicle that includes all of a driver's cab, a motor, and a haulage compartment that are integrated into a single vehicle; (3) provides that the motor can be located under the haulage compartment, at a considerable distance from the cab in which the driver sits, thereby reducing motor noise and vibration experienced by the driver; and (4) permits some wheels and tires to be elevated above the road surface, so that they do not roll along the road surface when the haulage compartment is empty. The foregoing desired characteristics are provided by the unique reduced wind resistance haulage vehicle apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a reduced wind resistance haulage vehicle apparatus which includes an undercarriage portion. A motor/transmission is supported by the undercarriage portion. Driven wheel assemblies are connected to the undercarriage portion and are powered by the motor/transmission. A cab portion is supported by the an undercarriage portion. The cab portion includes controls for controlling the motor/transmission. Steering wheel assemblies are supported by the undercarriage portion for steering by a driver seated in the cab portion. Idler wheel assemblies are also supported by the undercarriage portion. A haulage portion is supported by the undercarriage portion.

More specifically, the haulage portion includes haulage compartment side walls. Haulage compartment front doors are connected to the haulage compartment side walls. Haulage compartment rear doors are connected to the haulage compartment side walls. Preferably, the front doors open inward with respect to the haulage portion. Also, preferably, the rear doors open inward with respect to the haulage portion. When the haulage portion is empty, the front doors and the rear doors are opened, and air flow can flow through the haulage portion when the vehicle is driven along a road surface. As a result, the air resistance of the vehicle is significantly reduced, and the vehicle saves in energy demand and in fuel consumption.

Preferably, the motor/transmission is located midway between a front portion of the undercarriage portion and a rear portion of the undercarriage portion, whereby motor noise and vibration are reduced in the cab portion.

In addition, to further reduce energy demands of the motor/transmission, means can be provided for raising and lowering the idler wheel assemblies when the haulage portion has a light load or is empty. The means for raising and lowering the idler wheel assemblies can be air bags. The air bags can be controlled by the driver in the cab portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved reduced wind resistance haulage vehicle apparatus which has all of the advantages of the prior art and none of the disadvantages.

It is another object of the present invention to provide a new and improved reduced wind resistance haulage vehicle apparatus which may be easily and efficiently manufactured and marketed.

It is a further object of the present invention to provide a new and improved reduced wind resistance haulage vehicle apparatus which is of durable and reliable construction.

An even further object of the present invention is to provide a new and improved reduced wind resistance haulage vehicle apparatus which is susceptible of a low cost of manufacture with regard to both materials and labor, and which accordingly is then susceptible of low prices of sale to the consuming public, thereby making such reduced wind resistance haulage vehicle apparatus available to the buying public.

Still yet a further object of the present invention is to provide a new and improved reduced wind resistance haulage vehicle apparatus which permits air flow through the haulage compartment when the haulage compartment is empty.

Still another object of the present invention is to provide a new and improved reduced wind resistance haulage vehicle apparatus that provides a haulage vehicle that includes all of a driver's cab, a motor, and a haulage compartment that are integrated into a single vehicle.

Yet another object of the present invention is to provide a new and improved reduced wind resistance haulage vehicle apparatus which provides that the motor can be located under the haulage compartment, at a considerable distance from the cab in which the driver sits, thereby reducing motor noise and vibration experienced by the driver.

Even another object of the present invention is to provide a new and improved reduced wind resistance haulage vehicle apparatus that permits some wheels and tires to be elevated above the road surface, so that they do not roll along the road surface when the haulage compartment is empty.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the reduced wind resistance haulage vehicle apparatus of the invention, wherein the vehicle contains a load of material being hauled and wherein front haulage compartment doors and rear haulage compartment doors are closed.

FIG. 2 is a top view of the embodiment of the reduced wind resistance haulage vehicle apparatus shown in FIG. 1 taken along line 2-2 of FIG. 1, wherein the load of material being hauled is not shown.

FIG. 5 is a front view of the embodiment of the reduced wind resistance haulage vehicle apparatus of FIG. 1 taken along line 3-3 thereof, wherein the front haulage compartment doors are clearly shown as being open, so as to allow air to enter the haulage compartment.

FIG. 6 is a rear view of the embodiment of the invention shown in FIG. 1 taken along line 4-4 thereof, wherein the rear haulage compartment doors are clearly shown as being open, so as to allow air to exit from the haulage compartment.

DESCRIPTION OF THE PREFERRED EMBODIMENT

Figure 3:
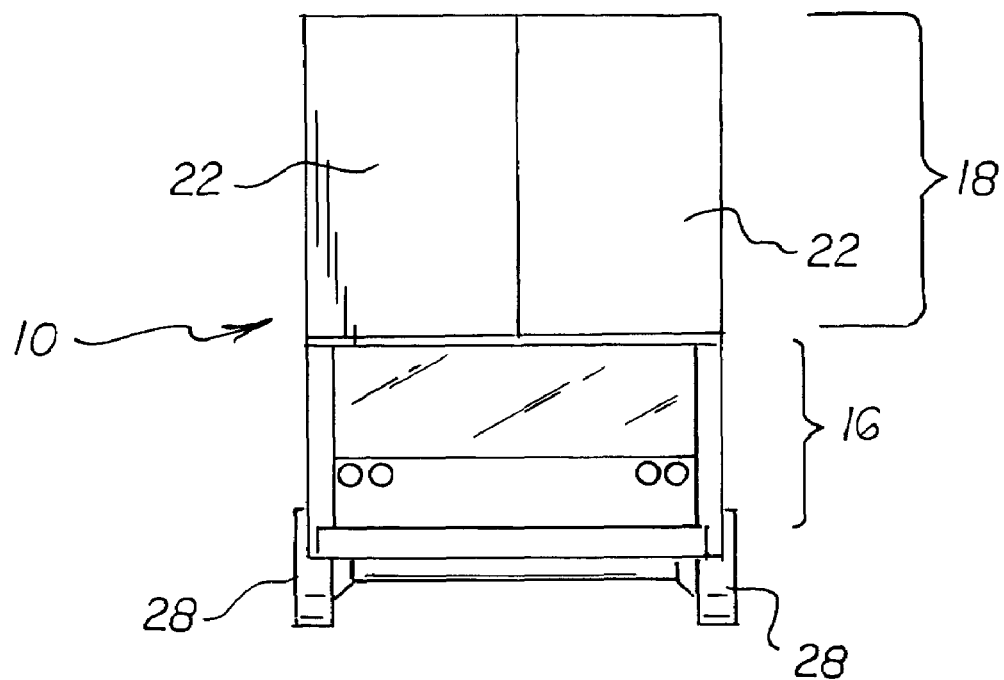
FIG. 3 is a front view of the embodiment of the reduced wind resistance haulage vehicle apparatus of FIG. 1 taken along line 3-3 thereof, wherein the front haulage compartment doors are clearly shown as being closed.
Figure 4:
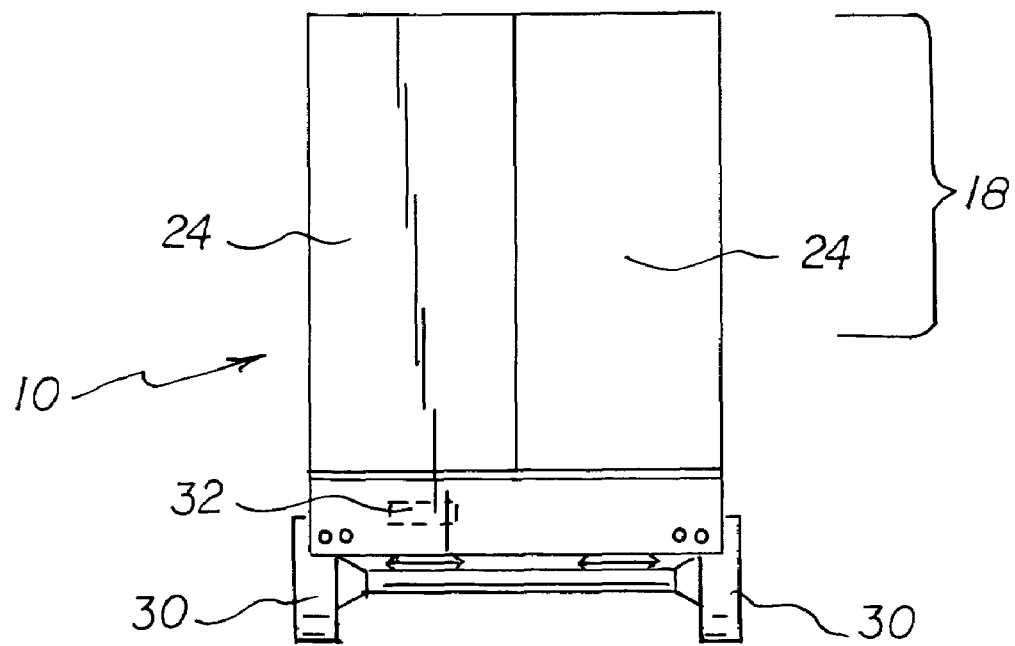
FIG. 4 is a rear view of the embodiment of the invention shown in FIG. 1 taken along line 4-4 thereof, wherein the rear haulage compartment doors are clearly shown as being closed.

With reference to the drawings, a new and improved reduced wind resistance haulage vehicle apparatus embodying the principles and concepts of the present invention will be described.

Turning to FIGS. 1-8, there is shown a preferred embodiment of the reduced wind resistance haulage vehicle apparatus of the invention generally designated by reference numeral 10. In each of the figures, reference numerals are shown that correspond to like reference numerals that designate like elements shown in other figures.

In the preferred embodiment, a reduced wind resistance haulage vehicle apparatus 10 includes an undercarriage portion 12. The undercarriage portion 12 can be either framed or frameless (unibody). A motor/transmission 14 is supported by the undercarriage portion 12. Driven wheel assemblies 26 are connected to the undercarriage portion 12 and are powered by the motor/transmission 14. A cab portion 16 is supported by the undercarriage portion 12 at the front thereof substantially as depicted in the drawings. The cab portion 16 includes controls for controlling the motor/transmission 14. Steerable wheel assemblies 28 are supported by the undercarriage portion 12 for steering by a driver seated in the cab portion 16. Idler wheel assemblies 30 are also supported by the undercarriage portion 12. A haulage portion 18 is supported by the undercarriage portion 12.

More specifically, the haulage portion 18 includes haulage compartment side walls 20. Haulage compartment front doors 22 are connected to the haulage compartment side walls 20 by use of suitable hinges or the like as is well known in the art. Similarly, haulage compartment rear doors 24 are suitably hingedly connected to the haulage compartment side walls 20. The front doors 22 and the rear doors 24 can be either side-hinged doors or overhead doors. The haulage compartment may have an open top (as illustrated) or may have a closed top or roof (not shown). The haulage portion 18 provides a haulage compartment which is defined by the undercarriage portion 12, the haulage compartment side walls 20, the front doors 22, and the rear doors 24.

If desired, weighing scale assemblies can be placed on axles supporting the driven wheel assemblies 26. Also, if desired, weighing scale assemblies can be placed on axles supporting the driven wheel assemblies 26. As shown, the front doors 22 preferably open inward with respect to the haulage portion 18.

Similarly, and as shown, the rear doors 24 preferably open inward with respect to the haulage portion 18. Alternatively, the rear doors 24 can be opened upwardly.

Optionally, the front doors 22 and the rear doors 24 can be opened automatically, by remote control, or manually. The motor/transmission 14 can be based on a diesel or gasoline engine. Preferably, the motor/transmission 14 is located midway between a front portion of the undercarriage portion 12 and a rear portion of the undercarriage portion 12. With the motor/transmission 14 being located away from the cab portion 16, motor noise and vibration are significantly reduced in the cab portion 16.

The motor/transmission 14 can be quickly changed by being raised above the undercarriage portion 12. However, for purposes of maintenance and repair, the motor/transmission 14 can be accessed from the side and the bottom of the undercarriage portion 12. Means can be provided for raising and lowering the idler wheel assemblies 30. The preferred means for raising and lowering the idler wheel assemblies 30 can be air bags 32.

Optionally, a rear-view camera can be placed on the rear of the haulage portion 18. Also, optionally. A back-up warning system can be employed. Also, the backing up procedure can be overridden and stopped when the rear of the vehicle touches an object.

Figure 7:
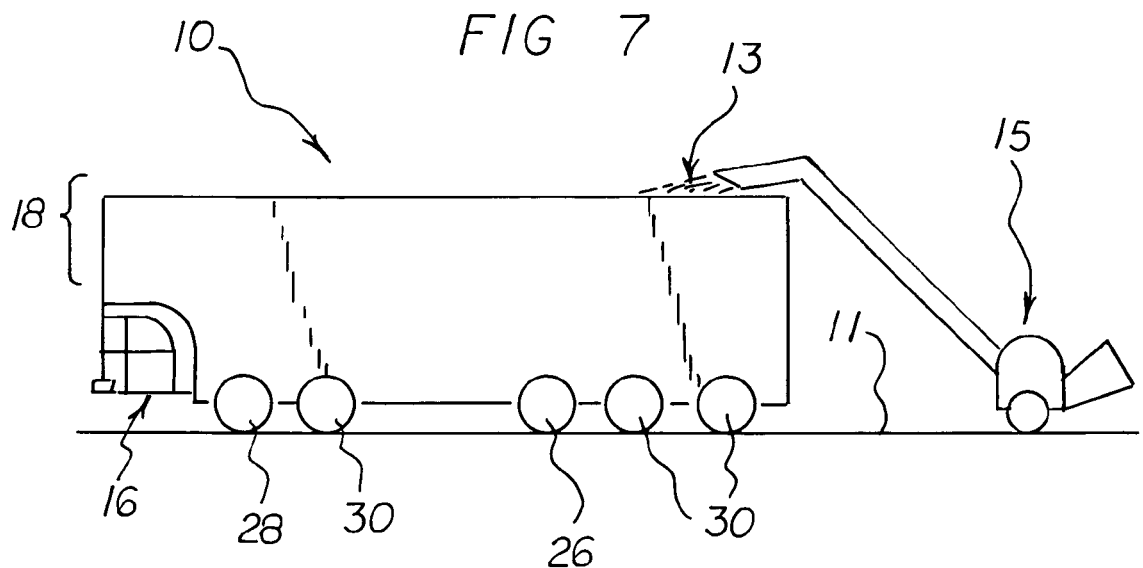
FIG. 7 is a side view of the embodiment of the invention shown in FIG. 1, wherein a load of material to be hauled is being deposited into the haulage compartment.
Figure 8:
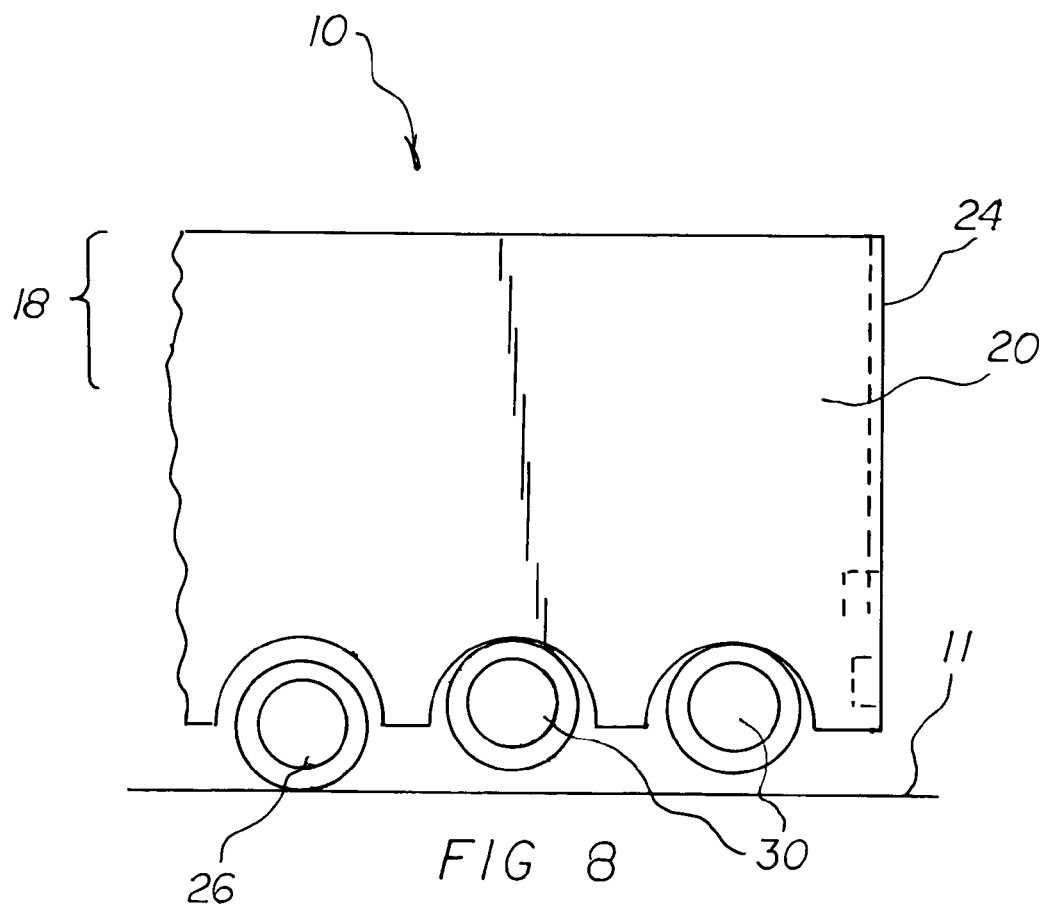
FIG. 8 is a side view of a portion of the embodiment of the invention shown in FIGS. 1 and 7, wherein non-driving wheels are raised above the road surface.

To use the reduced wind resistance haulage vehicle apparatus 10 of the invention, prior to placing a load, such as load material 13, into the haulage portion 18, the front doors 22 and the rear doors 24 are closed. Then, the load material 13 is placed in the haulage portion 18. For example, FIG. 7 shows a mulching machine 15 depositing load material 13 (e.g. wood chips or debris) into the haulage portion 18.

After the load material 13 has been removed from the haulage portion 18, the front doors 22 and the rear doors 24 are opened. As a result, there is a clear passageway for air to enter the haulage portion 18 through the open front doors 22, pass through the haulage portion 18, and exit from the haulage portion 18 through the open rear doors 24. As a result, the haulage portion 18 provides for significantly reduced air resistance as the vehicle is driven along a road surface 11. When the air resistance is so reduced, the motor/transmission 14 operates more efficiently and uses less fuel.

In contrast, when the front doors 22 and the rear doors 24 are closed, the vehicle provides a significantly greater air resistance as the vehicle is driven along a road surface 11, thereby causing more load on the motor/transmission 14 and requiring more fuel use and the expenditure of more energy. To further reduce the load on the motor/transmission 14 and to further reduce the expenditure of fuel and energy, the idler wheel assemblies 30 can be lifted by the air bags 32 when the haulage portion 18 is either empty or contains a relatively light load.

It will be appreciated from the drawings that in accordance with the preferred embodiment of the invention, the front doors are located above the cab 16 and therefore have a less vertical extent than the rear doors 24. It is believed that this arrangement helps to improve the efficiency of the flow of air through the open doors 22, 24 when the vehicle is moving because of the airfoil effect of the cab portion 16. It further will be appreciated that any suitable means may be used to move the doors 22, 24 from and a closed condition to an open condition and vice versa such as an electric motor or hydraulic motor suitably controlled from the cab or through a remote controller apparatus. Alternatively, the doors 22, 24 may be manually moved from a closed condition to an open condition and vice versa and suitable locking devices used to maintain the doors in either condition, as desired. A still further feature of the present invention, is the provision of a control system disposed between the weighing scales or other weight sensors on the undercarriage of the vehicle and the cab or vehicle operator for automatically opening the doors 22, 24 when the vehicle weight falls below a predetermined magnitude corresponding to an empty condition.

The components of the reduced wind resistance haulage vehicle apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved reduced wind resistance haulage vehicle apparatus that is low in cost, relatively simple in design and operation, and which may advantageously be used to permit air flow through the haulage compartment when the haulage compartment is empty. With the invention, a reduced wind resistance haulage vehicle apparatus provides a haulage vehicle that includes all of a driver's cab, a motor, and a haulage compartment that are integrated into a single vehicle. With the invention, a reduced wind resistance haulage vehicle apparatus provides that the motor can be located under the haulage compartment, at a considerable distance from the cab in which the driver sits, thereby reducing motor noise and vibration experienced by the driver. With the invention, a reduced wind resistance haulage vehicle apparatus is provided which permits some wheels and tires to be elevated above the road surface, so that they do not roll along the road surface when the haulage compartment is empty.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example instead of employing a pair of doors (bi-fold arrangement) for the front and rear doors, a single door hingedly connected to only side wall may be used instead at either the front or back, or both.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A reduced wind resistance haulage vehicle apparatus, comprising:
   an undercarriage portion,
   a motor/transmission supported by said undercarriage portion,
   driven wheel assemblies connected to said undercarriage portion and powered by said motor/transmission,
   a cab portion supported by said undercarriage portion, wherein said cab portion includes controls for controlling said motor/transmission,
   steerable wheel assemblies supported by said undercarriage portion for steering by a driver in said cab portion,
   a haulage portion supported by said undercarriage portion, wherein said haulage portion includes haulage compartment side walls, a haulage compartment front door connected to at least one of said side walls of said haulage compartment, and a haulage compartment rear door connected to at least one of said sidewalls of said haulage compartment, and
   wherein at least said front door comprises a pair of doors hingedly connected to said walls, respectively and which are adapted to open inward with respect to said haulage portion.

2. The apparatus of claim 1 wherein said rear door comprises a pair of doors hingedly connected to said side walls, respectively and which are adapted to open inward with respect to said haulage portion.

3. The apparatus of claim 1 wherein said motor/transmission is located midway between a front portion of said undercarriage portion and a rear portion of said undercarriage portion.

4. The apparatus of claim 1, further including:
   idler wheel assemblies supported by said undercarriage portion.

5. The apparatus of claim 4, further including:
   means for raising and lowering said idler wheel assemblies.

6. The apparatus of claim 5 wherein said means for raising and lowering said idler wheel assemblies are air bags.

7. A reduced wind resistance haulage vehicle apparatus, comprising:
   an undercarriage portion,
   a motor/transmission supported by said undercarriage portion,
   driven wheel assemblies connected to said undercarriage portion and powered by said motor/transmission,
   a cab portion supported by said undercarriage portion, wherein said cab portion includes controls for controlling said motor/transmission,
   steerable wheel assemblies supported by said undercarriage portion for steering by a driver in said cab portion,
   a haulage portion supported by said undercarriage portion, wherein said haulage portion includes haulage compartment side walls, a haulage compartment front door connected to at least one of said side walls of said haulage compartment, and a haulage compartment rear door connected to at least one of said sidewalls of said haulage compartment,
   wherein said front door comprises a pair of doors hingedly connected to said walls, respectively and which are adapted to open inward with respect to said haulage portion, and
   wherein said haulage compartment front door is connected to said haulage compartment and is located above said cab portion and is of lesser vertical extent than said rear door connected to said haulage compartment at the rear of said vehicle.

8. The apparatus of claim 7 wherein said rear door comprises a pair of doors hingedly connected to said side walls, respectively and which are adapted to open inward with respect to said haulage portion.

9. A reduced wind resistance haulage vehicle apparatus, comprising:
   an undercarriage portion,
   a motor/transmission supported by said an undercarriage portion,
   driven wheel assemblies connected to said undercarriage portion and powered by said motor/transmission,
   a cab portion supported by said an undercarriage portion, wherein said cab portion includes controls for controlling said motor/transmission,
   steerable wheel assemblies supported by said undercarriage portion for steering by a driver in said cab portion,
   a haulage portion supported by said undercarriage portion, wherein said haulage portion includes haulage compartment side walls, a haulage compartment front door connected to at least one of said side walls of said haulage compartment, and a haulage compartment rear door connected to at least one of said sidewalls of said haulage compartment, and
   wherein at least said rear door comprises a pair of doors hingedly connected to said side walls, respectively and which are adapted to open inward with respect to said haulage portion.

* * * * *